(12) United States Patent
Maione et al.

(10) Patent No.: US 8,989,177 B2
(45) Date of Patent: Mar. 24, 2015

(54) LAWFUL INTERCEPTION IN A COMMUNICATIONS NETWORK

(75) Inventors: Biagio Maione, Naples (IT); Francesco Attanasio, Roccapiemonte (IT); Maurizio Iovieno, Mercato San Severino (IT); Ros-Marie Furtenback, Johanneshov (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 39 days.

(21) Appl. No.: 13/564,213

(22) Filed: Aug. 1, 2012

(65) Prior Publication Data

US 2014/0010228 A1  Jan. 9, 2014

(30) Foreign Application Priority Data

Jul. 9, 2012  (WO) ................. PCT/EP2012/063370

(51) Int. Cl.
  *H04L 12/66* (2006.01)
  *H04L 29/06* (2006.01)
  *H04W 12/02* (2009.01)
  *H04W 36/00* (2009.01)

(52) U.S. Cl.
  CPC ............. *H04L 63/30* (2013.01); *H04L 63/306* (2013.01); *H04W 12/02* (2013.01); *H04W 36/00* (2013.01)
  USPC ........................................................ 370/352

(58) Field of Classification Search
  CPC ...................................................... H04L 51/43
  USPC .................... 709/238; 370/331, 241; 455/436
  See application file for complete search history.

(56) References Cited

U.S. PATENT DOCUMENTS

| | | | |
|---|---|---|---|
| 2005/0152275 A1* | 7/2005 | Laurila et al. ................. | 370/241 |
| 2010/0215018 A1* | 8/2010 | Ejzak ............................ | 370/331 |
| 2011/0141947 A1 | 6/2011 | Li et al. | |
| 2012/0115479 A1* | 5/2012 | Ehrenholm et al. .......... | 455/436 |
| 2013/0311672 A1* | 11/2013 | Chastain ....................... | 709/238 |

FOREIGN PATENT DOCUMENTS

WO  WO 2004/103006 A1  11/2004

OTHER PUBLICATIONS

PCT International Search Report and Written Opinion mailed Mar. 22, 2013, issued in International Application No. PCT/EP2012/063370, International filing date Jul. 9, 2012 (11 pgs).
"$3^{rd}$ Generation Partnership Project; Technical Specification Group Services and System Aspects; 3G Security; Lawful interception architecture and functions (Release 11)"; 3GPP Standard; 3GPP TS 33.107, $3^{rd}$ Generation Partnership Project (3GPP), Mobile Competence Centre; 650, Route Des Lucioles; F-06921 Sophia-Antipolis Dedex; France, vol. SA WG3, No. V11.2.0, Jun. 29, 2012, pp. 1-135, XP050581050.

(Continued)

*Primary Examiner* — Andrew Lai
*Assistant Examiner* — Jamaal Henson

(57) ABSTRACT

A method and apparatus for performing Lawful Interception in a communications network. An Access Transfer Control Function (ATCF) receives an activation message instructing lawful interception. The activation message includes a subject identity. The ATCF sends intercept related information to a Mediation Function at a Lawful Intercept node. The intercept related information relates to a communication session in which the subject participates.

10 Claims, 7 Drawing Sheets

(56) References Cited

OTHER PUBLICATIONS

"3$^{rd}$ Generation Partnership Project; Technical Specification Group Services and System Aspects; Single Radio Voice Call Continuity (SRVCC); Stage 2 (Release 11)"; 3GPP Standard; 3GPP TS 23.216, 3$^{rd}$ Generation Partnership Project (3GPP), Mobile Competence Centre; 650, Route Des Lucioles; F-06921 Sophia-Antipolis Cedex; France, vol. SA WG2, No. V11.5.0, Jun. 15, 2012, pp. 1-67, XP050580711.

"3$^{rd}$ Generation Partnership Project; Technical Specification Group Services and System Aspects; IP Multimedia Subsystem (IMS) Service Continuity; Stage 2 (Release 11)"; 3GPP Standard; 3GPP TS 23.237, 3$^{rd}$ Generation Partnership Project (3GPP), Mobile Competence Centre; 650, Route Des Lucioles; F-06921 Sophia-Antipolis Cedex; France, vol. SA WG2, No. V11.5.0, Jun. 15, 2012, pp. 1-163, XP050580713.

3GPP TS 33.106 v12.3.0 (Mar. 2014); 3$^{rd}$ Generation Partnership Project; Technical Specification Group Services and System Aspects; 3G Security, Lawful Interception Requirements; Release 12); 17 pages.

3GPP TS 33.108 v12.4.0 (Mar. 2014); 3$^{rd}$ Generation Partnership Project; Technical Specification Group Services and System Aspects; 3G Security; Handover Interface for Lawful Interception (LI); Release 12; 208 pages.

3GPP TS 23.216 v12.0.0 (Dec. 2013); 3$^{rd}$ Generation Partnership Project; Technical Specification Group Services and System Aspects; Single Radio Voice Call Continuity (SRVCC); Stage 2 (Release 8); 69 pages.

3GPP TS 23.292 v12.3.0 (Mar. 2014); 3$^{rd}$ Generation Partnership Project; Technical Specification Group Services and System Aspects; IP Multimedia Subsystem (IMS) Centralized Services; Stage 2 (Release 12); 120 pages.

3GPP TS 23.237 v12.6.0 (Mar. 2014); 3$^{rd}$ Generation Partnership Project; Technical Specification Group Services and System Aspects; IP Multimedia Subsystem (IMS) Service Continuity; Stage 2 (Release 12); 172 pages.

3GPP TS 33.107 v12.6.0 (Mar. 2014); 3$^{rd}$ Generation Partnership Project6; Technical Specification Group Services and System Aspects; 3G Security; Lawful Interception Architecture and Functions (Release (12); 187 pages.

\* cited by examiner

LAWFUL INTERCEPTION IN A COMMUNICATIONS NETWORK

TECHNICAL FIELD

The invention relates to providing lawful interception in a communications network.

BACKGROUND

Lawful Interception (LI) allows Law Enforcement Agencies (LEAs) to obtain communication network data for the purpose of analysis or gathering evidence. The data typically includes details of signalling, such as called and calling parties, and in some instances the contents of the call itself. 3GPP TS 33.107 "Lawful interception architecture and functions" describes the architecture and functional requirements with a Third Generation Mobile Communication System. FIG. 1 shows the architecture. A Law Enforcement Monitoring Facility (LEMF) 1 may be connected to a 3G network or any other network. An Administration Function (ADMF) 2 communicates with the LEMF 1. Note that more than one LEMF is shown because the ADMF may communicate with several different LEMFs. Owing to different legal LI requirements, the LI information shared with different LEMFs may be different. For simplicity, the following discussing refers to a single LEMF 1. The ADMF 2 communicates with the LEMF 1 using a Mediation Function (MF) 3 via a HI1 interface.

Two Delivery Functions (DFs) are provided. DF2 4 communicates with the LEMF 1 via a HI2 interface and is used to send Intercept Related Information (IRI) to the LEMF 1 using a MF 5. DF2 4 receives IRI from the network via an X2 interface. In a Circuit Switched (CS) network, IRI is triggered by events that may be call-related or non-call related. In a Packet Switched (PS) network, IRI may be triggered by events that are session related or session unrelated.

DF3 6 receives the content of a communication subject to LI and sends this to the LEMF 1 using a MF 7 via a HI3 interface.

The ADMF 2, DF2 4 and DF3 6 communicate with a traffic node, also termed an Intercepting Control Element (ICE) 8. The form of the ICE depends on the network in which it is located. For example, an ICE in an IMS network could be a Proxy-Call Session Control Function (P-CSCF) or a Serving-Call Session Control Function (S-CSCF). It may be a Mobile Switching Centre (MSC) server in a 3G network, a Serving GPRS Support Node (SGSN), a Gateway GSN (GGSN), or a Media Gateway (MGW). An ICE performs interception, and in the event that there is more than one ICE, each ICE performs interception independently of other ICEs. Interception actions that the ICE performs include interrogation, activation, deactivation and invocation. An ICE is sometimes referred to as an Intercept Access Point (IAP). Depending on the types of network involved, an ICE can control interception in different networks, e.g. 2G/3G PS domain, CS domain, SAE/LTE.

New and more advanced technologies are introduced in order to provide the end-user with a better experience and to more efficiently utilize radio resources. As network technologies change, existing and replacement technologies exist in parallel for a time, and session and call continuity between the existing and new technologies is needed for an acceptable end-user experience. However, where session data (such as a call) must be intercepted, LEAs also require continuity of interception for the same session/call.

An example of an existing network being replaced by a new network is a circuit switched (CS) network being replaced by a Long Term Evolution (LTE) network. LTE capable networks do not have embedded CS technology, and so voice and video services are provided to the a user by means of IP Multimedia Subsystem (IMS) services, as defined by e.g. the Voice over LTE (VoLTE) profile adopted by the GSMA. However, in the first phases of its deployment, it is expected that the next generation of packet switched LTE access networks (also referred to as E-UTRAN), will not provide full coverage. As an example, depending on the Network Operator migration strategy, initial installations may focus on the most densely populated areas. Moreover, migration (moving from an existing to a new technology) scenarios may lead to islands of E-UTRAN coverage bounded by either GERAN (GSM access network) or UTRAN (WCDMA access network).

Currently, an LTE subscriber can use a dual mode terminal to initiate calls in the E-UTRAN domain or in the GERAN domain or in the UTRAN domain. To allow a smooth migration towards LTE network, Single Radio Voice Call Continuity (SRVCC) provides the ability to allow transition of a voice call from an LTE packet domain to a legacy circuit domain (GSM/WCMA) when LTE coverage becomes poor during a call which was started as VoLTE/IMS call.

For an operator with a legacy (GSM/WCDMA) cellular network who wishes to deploy IMS/VoIP-based voice services in conjunction with the rollout of an LTE network, SRVCC allows voice call continuity (VCC) in case of inter-domain handover from E-UTRAN to UTRAN/GERAN due to e.g. limited E-UTRAN coverage.

Referring to FIG. 2, 3GPP TS 23.216 "Single Radio Voice Call Continuity (SRVCC)" provides that a procedure for single radio voice continuity (SRVCC) is triggered by E-UTRAN towards a Mobility Management Entity (MME), based on measurement reports S1 received by a User Equipment (UE) 9 from a E-UTRAN access network 10. The E-UTRAN access network 10 informs S2 an MME 11 that handover is required, and the MME 11 initiates S3 the SRVCC procedure with the MSC Server 12 enhanced for SRVCC via the Sv reference for a single voice call. The MME 11 also handles S4 a handover for non-voice, if required. The MSC Server 12 enhanced for SRVCC then initiates S5, S6 the session transfer procedure to IMS 14 and coordinates it with the CS handover procedure to the target cell 13. The MSC Server 12 enhanced for SRVCC then sends S7 a PS-CS handover Response towards the MME 11, which includes the necessary CS HO information for the UE to access the UTRAN/GERAN. This is sent S8 to the E-UTRAN cell 10, which sends S10 a handover command to the UE 9, allowing the UE 10 to execute S10 the handover.

Centralization of IMS services and service continuity is specified in 3GPP TS 23.237 and 3GPP TS 23.292. These documents specify that a user must receive services in a consistent manner whether the user accesses the IMS via a CS or a PS. Service continuity is supported between the CS and PS domains. IMS Service Continuity allows for continuing ongoing communication sessions with multiple media formats across different access networks. This level of continuity is required because UEs with multimedia capabilities may move across a multiplicity of different access networks.

Referring to FIG. 3, IMS Service Continuity requires a Service Centralization and Continuity (SCC) AS 15 in the IMS network 14, and a UE 9 with SC capabilities. The SCC AS 15 provides IMS-based mechanisms for enabling service continuity of multimedia sessions. In order to enhance service experience during the inter domain handover, two additional network nodes are provided. An Access Transfer Control Function (ATCF) 16 located between a Proxy-Call Session Control Function (P-CSCF) 17 and a Serving-Call Session Control Function (S-CSCF) 18 and is used as a signalling anchor point. An Access Transfer Gateway (ATGW) 19 is located in the IMS network 14 between the UE 9 and a MSS or MSC 20, and is used for media anchoring.

The ATCF 16 is included in the session control plane for the duration of a session call before and after Access Transfer. During registration, the ATCF 16 provides its address in a header which is later used by the MSC 20 to find the ATCF 16. Signalling on the 12 interface between the ATCF 16 and the MSC 20 relates to an already established session, or a session being established by SRVCC procedures. Correlation between sessions is performed using a C-MSISDN provided to the ATCF 16 during registration.

The ATGW 19 is controlled by the ATCF 16 and stays in the session media path both for the duration of the session and also after Access Transfer, based on the local policy of the serving network.

FIG. 4 shows the signalling and bearer paths for a CS session that allows a subsequent CS to PS transfer when the media path is established using a CS access network. The media path 21 goes directly via the ATGW 19. The signalling path in the access leg 22 comprises standard IMS signalling between the MSC Server 20 and the ATCF 16. The access leg of the signalling path 23 goes to a CSCF 18 via the SCC-AS 15, and the remote leg 24 of the signalling path traverses the Telephony Application Server (TAS) 16.

A Voice over LTE call can be subject to LI for both media and signalling. However, when the VoLTE call is handed-over to GSM/WCDMA (in an SRVCC procedure), in order to provide LI, interception must start in the CS domain. In this case, correlation for interception between and after the handover cannot be provided, and so LI continuity cannot be provided when a VoLTE call is subject to inter-domain (to GSM/WCDMA) handover (SRVCC). Lack of correlation between and after the handover could be an issue from a regulatory point of view.

SUMMARY

It is an object of the invention to provide techniques for allowing LI continuity in the event of a domain handover from a PS to a CS access network using SRVCC. According to a first aspect, there is provided a method of performing Lawful Interception in a communications network. An Access Transfer Control Function (ATCF) receives an activation message instructing lawful interception. The activation message includes a subject identity. The ATCF sends intercept related information to a Mediation Function at a Lawful Intercept node. The intercept related information relates to a communication session in which the subject participates. An advantage of using the ATCF as an Intercept Access Point is that LI can be maintained on an existing communication session subject to LI, even when the communication session is handed over to a CS access network.

As an option, signalling relating to the communication session is sent from the ATCF to a terminal associated with the subject via a Proxy-Call Session Control Function. An instruction to perform Single Radio Voice Call Continuity (SRVCC) on the communication session is received, and signalling relating to the communication session to the terminal associated with the subject is then sent via a circuit switched access network The ATCF optionally sends a further activation message to an Access Transfer Gateway (ATGW). The further activation message instructs the ATGW to send media relating to the communication session in which the subject participates to a Mediation Function. This allows LI continuity for the call session media to be maintained in the event of SRVCC.

According to a second aspect, there is provided a node for use in an IP Multimedia Subsystem (IMS) communications network. The node is provided with a first receiver for receiving from an Administration Function an activation message instructing lawful interception: The activation message includes a subject identity. A processor is provided for intercepting signalling relating to a communication session in which the subject participates. A first transmitter is provided for sending intercept related information to a Mediation Function at a Lawful Intercept node, the intercept related information relating to the communication session. A second transmitter is provided for sending signalling relating to the communication session to a terminal associated with the subject via a Proxy-Call Session Control Function. A second receiver is provided for receiving an instruction to perform SRVCC on the communication session. A third transmitter is provided for sending signalling relating to the communication session to the terminal via a circuit switched access network. An advantage of this node is that it ensures that LI can be maintained on a communication session both before and after SRVCC.

As an option, the node is also provided with a fourth transmitter for sending a further activation message to an ATGW node. The further activation message instructs the ATGW node to send media relating to the communication session to a Mediation Function. This ensures that LI of the media in the communication session can be maintained after SRVCC.

As a further option, the intercept related information is sent to the Mediation Function at the Lawful Intercept node via an X2 interface.

According to a third aspect, there is provided a node for use in an IMS network. The node is provided with a first receiver for receiving an activation message from an ATCF. The activation message instructs interception of a communication session handled by the node. A processor is provided for intercepting media relating to the communication session. A first transmitter is provided for sending the intercepted media to a Mediation Function at a Lawful Intercept node. A second transmitter is provided for sending media relating to the communication session to a terminal using an Mb interface. A second receiver is provided for receiving an instruction to perform SRVCC on the communication session, and a third transmitter is provided for sending media relating to the communication session to the terminal via a circuit switched access network. An advantage is that LI continuity of intercepted media is ensured for a session before SRVCC and after SRVCC.

According to a fourth aspect, there is provided a node for use in instructing Lawful Interception in a communications network. The node is provided with an Administration Function for generating a request for Lawful Interception, the request including an identity of a subject of Lawful Interception. A transmitter is also provided for sending the request to an ATCF in an IP Multimedia Subsystem communications network. By sending the request to an ATCF, rather than another node such as a P-CSCF, LI continuity is maintained for a communication session that is subject to SRVCC.

According to a fifth aspect, there is provided a computer program comprising computer readable code which, when run on a node in an IMS communication network, causes the node to perform the methods described above in the first aspect.

According to a sixth aspect, there is provided a computer program comprising computer readable code which, when run on a node in an IMS communications network, causes the node to behave as a node described above in the third aspect.

According to a seventh aspect, there is provided a computer program product comprising a computer readable medium and a computer program as described above in the fifth or sixth aspects. The computer program is stored on the computer readable medium.

DETAILED DESCRIPTION

The ATCF, together with the ATGW, acts as the Intercept Access Point. As signalling traverses the ATCF both before and after SRVCC, and media traverse the ATGW both before and after SRVCC, continuity of a VoLTE communication is provided, and the LI of the communication that begins before SRVCC can be maintained after SRVCC. This requires the network architecture described in 3GPP TS 33.107 to be enhanced to include the ATCF and the ATGW as an ICE/INE, and requires interfaces between the ATCF and the ATGW with other elements such as a Mediation Function to be defined.

Figure 6:
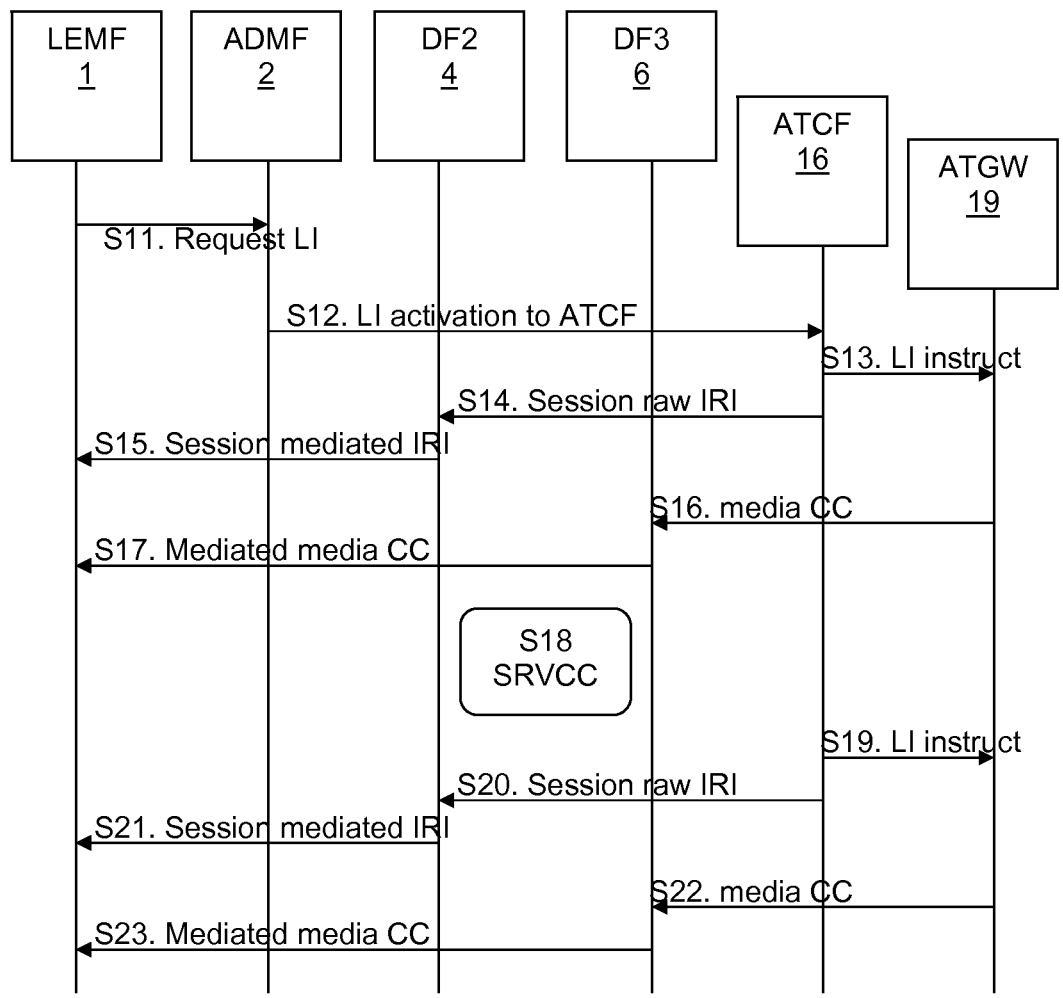
FIG. 6 is a signalling diagram showing signalling according to an embodiment of the invention.

FIG. 6 illustrates a network architecture and signalling paths according to an embodiment of the invention. Dotted line 26 shows signalling between a UE 9 and a terminating network 27 prior to SRVCC. The signalling traverses a P-CSCF 17 in an IMS network 14 and the ATCF 16. It is then sent to the terminating network 27 via a S-CSCF 18. As the ATCF 16 acts as an IAP, it is provided with an X2 interface towards a Mediation Function 28, which allows the signalling to be intercepted at the ATCF 16 and forwarded to the MF 28 and then onto an LEMF 1.

Figure 1:
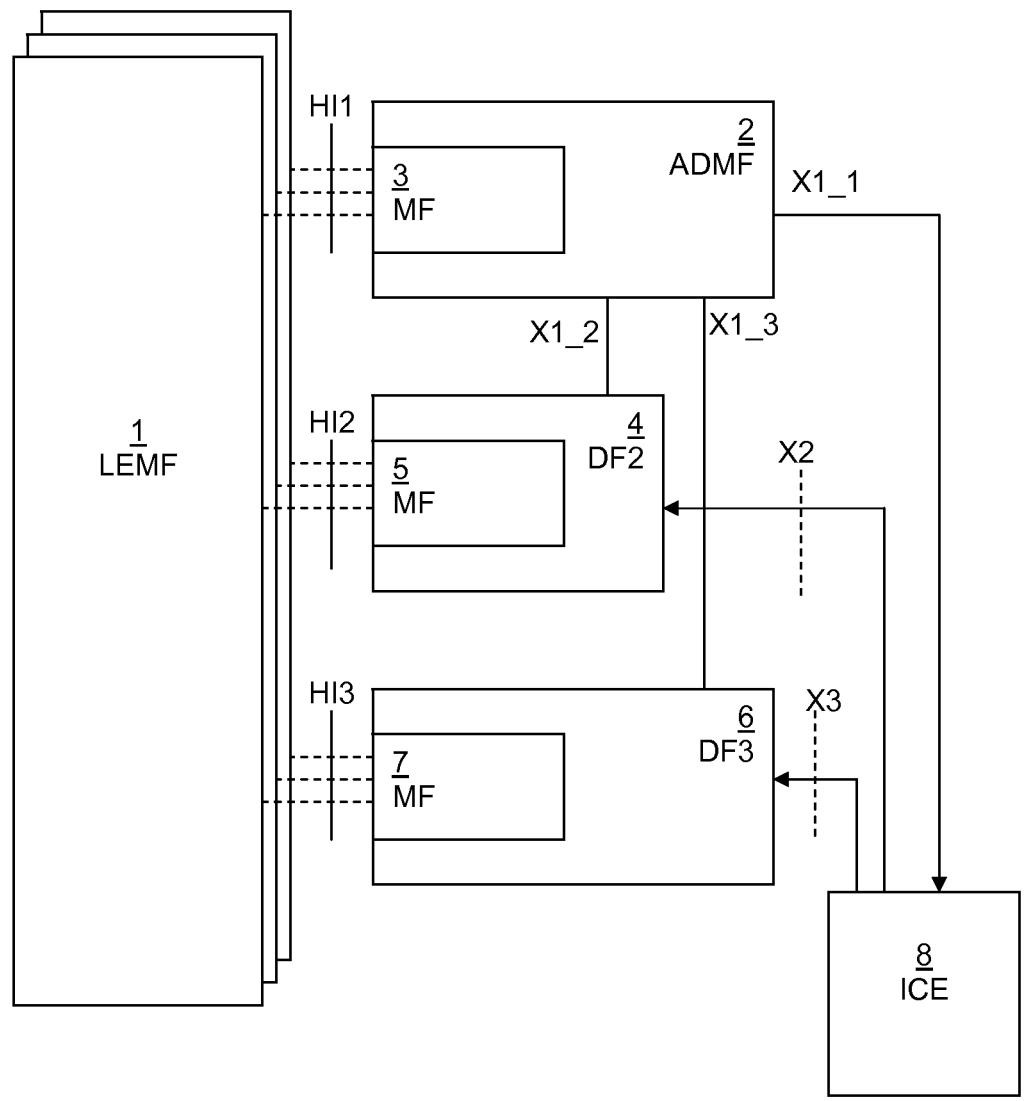
FIG. 1 illustrates schematically in a block diagram a network architecture for providing lawful interception.
Figure 2:
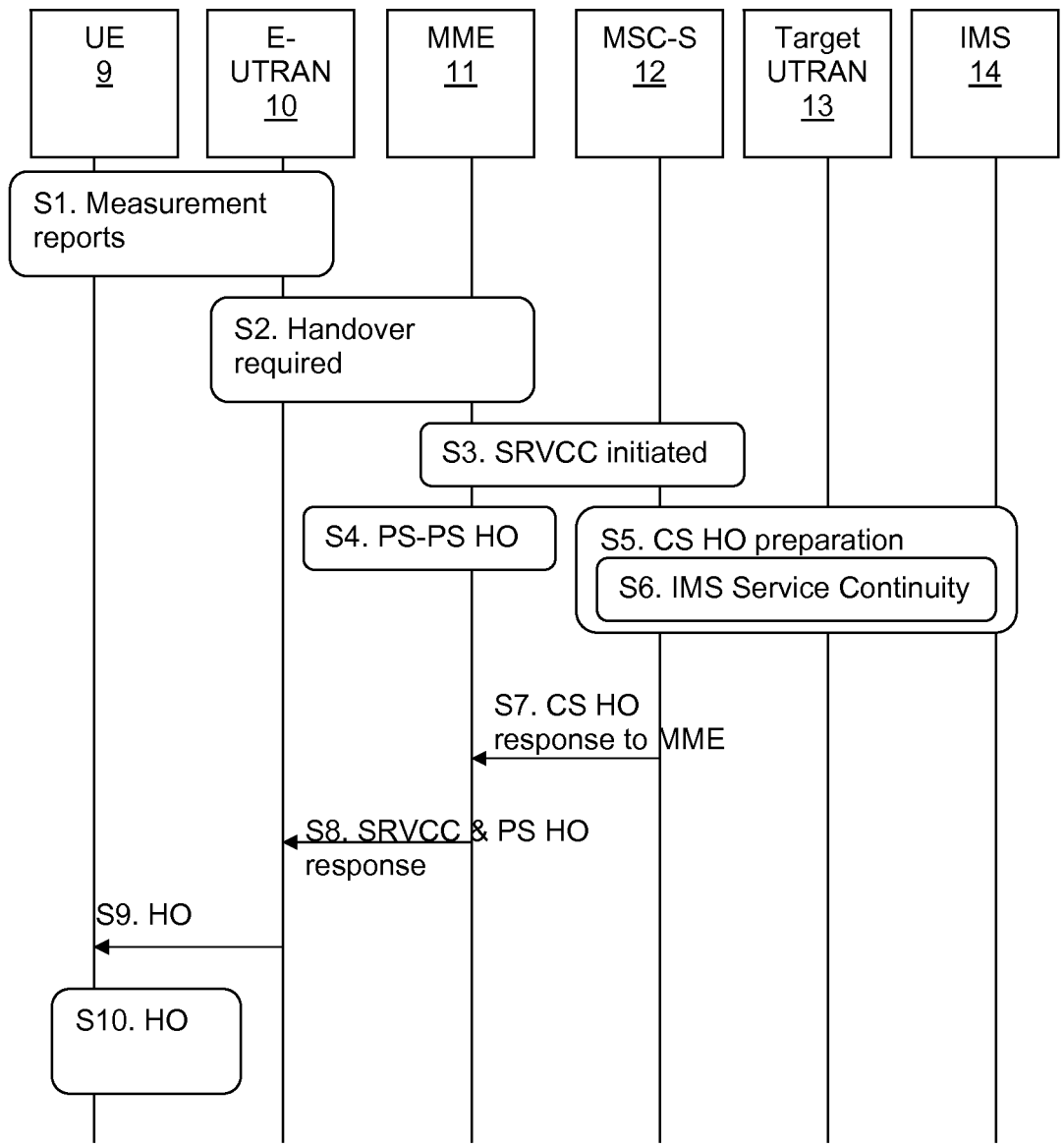
FIG. 2 is a signalling diagram showing signalling required for SRVCC.
Figure 3:
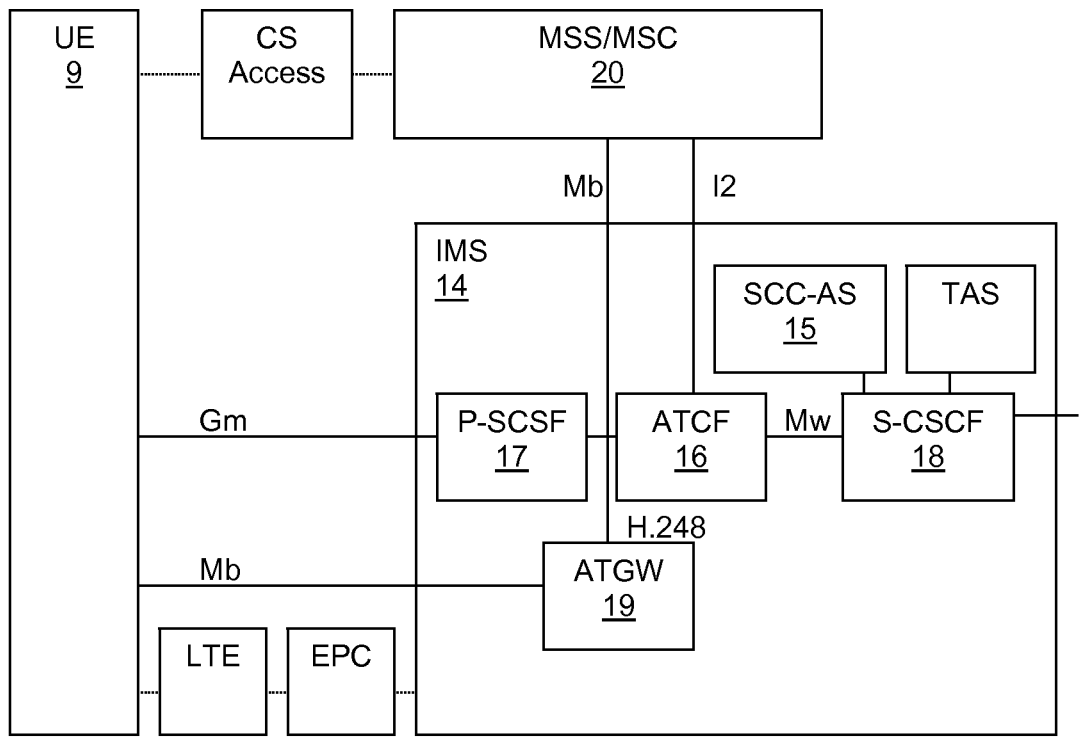
FIG. 3 illustrates schematically in a block diagram a network architecture for providing IMS Service Continuity.
Figure 4:
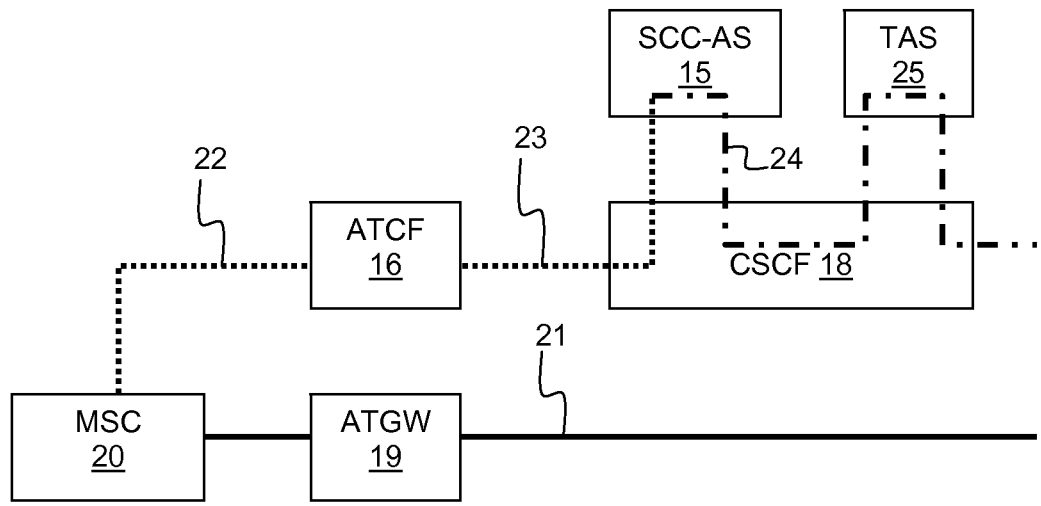
FIG. 4 illustrates schematically in a block diagram a network architecture and signalling and bearer paths for a CS media session.
Figure 5:
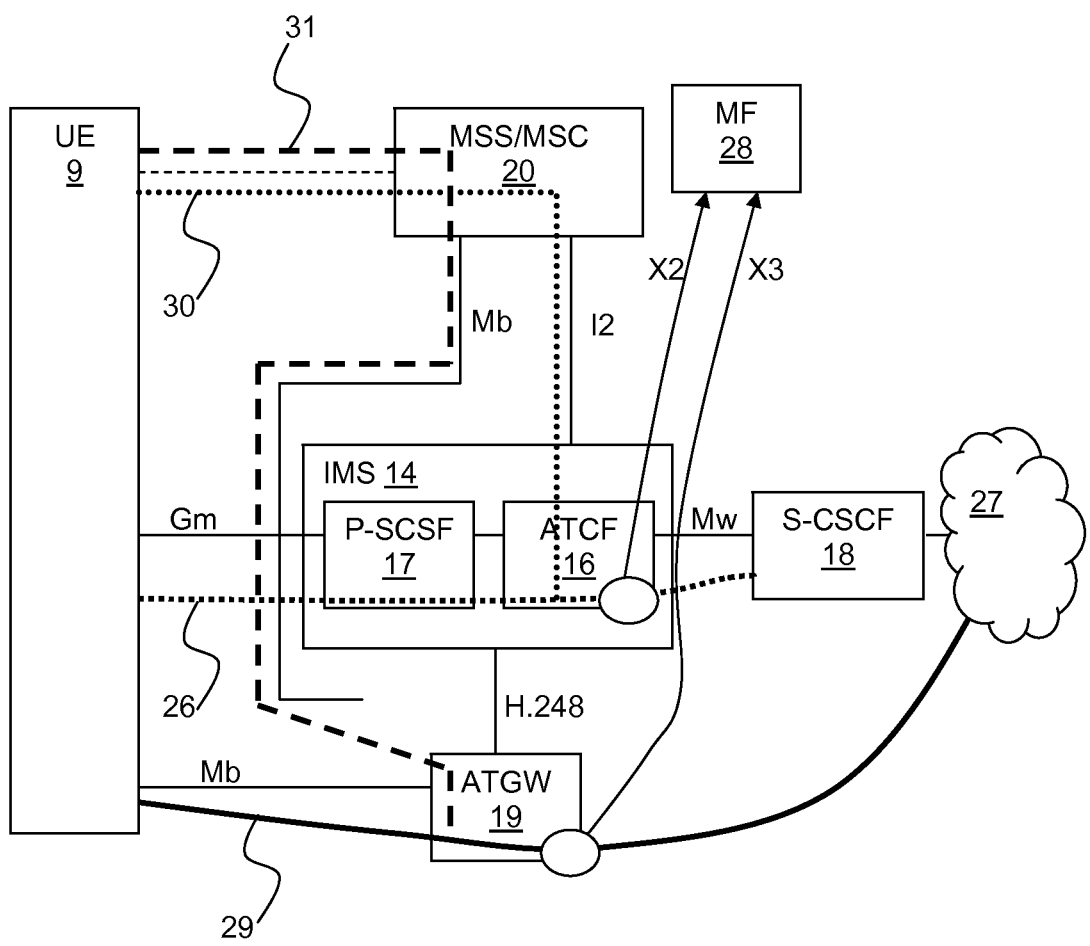
FIG. 5 illustrates schematically in a block diagram a network architecture and signalling and bearer paths before and after SRVCC according to an embodiment of the invention.

Similarly, solid line 29 illustrates the path of the media prior to SRVCC. This is sent between the ATGW 19 and the UE 9 via an Mb interface, and between the ATGW 19 and the terminating network 27. As the ATGW acts as an IAP, it intercepts the media and sends it to a MF 28 via an X3 interface. Note that only one MF 28 is shown in FIG. 5 for simplicity. However, the ATCF 16 will send IRI to a MF at a DF2, and the ATGW 19 sends intercepted media to a MF at a DF3.

In the event that SRVCC is required, the UE 9 falls back to a CS network. In this case, the signalling is sent between the UE9 and the terminating network 27 as shown in dotted line 30, which traverses a MSS/MCS 20, the ATCF 16 and the S-CSCF 18. As before, the ATCF acts as an IAP, and so IRI is sent to the MF 28 using the X2 interface between the MF 28 and the ATCF.

After SRVCC, media relating to the communication is sent between the UE 9 and the terminating network 27 as shown in dashed line 31. The media traverses the MSS/MSC 20, the ATGW 19 and the terminating network 27. Again, the ATGW acts as an IAP for the media, and so a copy is sent to the MF 28 via the established X3 interface.

By making the ATCF 16 and the ATGW 19 the IAPs for the signalling and the media respectively, LI can be maintained for a communication subject to LI prior to SRVCC even after SRVCC has been performed. This is not possible where the P-CSCF is the IAP 17, as it will not have access to the IRI after performing SRVCC.

FIG. 6 shows the signalling according to an embodiment of the invention, with the following numbering corresponding to that of FIG. 6:

S11. The LEMF 1 sends a request to the ADMF 2 for LI. This request identifies at least a target subject for LI.

S12. The ADMF 2 sends a message for LI activation to the ATCF 16. The ATCF 16 is instructed to being LI and to maintain LI during and after SRVCC.

S13. The ATCF 16 sends an instruction to the ATGW 19 to activate LI.

S14. Raw IRI for a session subject to LI is sent from the ATCF 16 to the DF2 4. This may include information such as a tel uri.

S15. Mediated IRI for the intercepted session is sent from the DF2 4 to the LEMF 1.

S16. Media Communication Content (CC) is sent from the ATGW 19 to the DF3 6.

S17. Mediated media CC is sent from the DF3 6 to the LEMF 1.

S18. The above interception in steps S14 to S17 all occurs when the UE 9 uses a CS access network. SRVCC is now performed so that the UE 9 falls back to a PS access network.

S19. In most circumstances, it is not necessary to reactivate LI in the ATGW 19, in which case step S19 is not required. However, in some circumstances an H.248 context related to the call may change, in which case a new LI instruction message is sent from the ATCF 16 to the ATGW 19.

S20. As the ATCF 16 remains the signalling anchor point after SRVCC, raw IRI for a session subject to LI is sent from the ATCF 16 to the DF2 4.

S21. As the ATGW 19 remains the media anchor point after SRVCC, mediated IRI for the intercepted session is sent from the DF2 4 to the LEMF 1.

S22. Media Communication Content (CC) is sent from the ATGW 19 to the DF3 6.

S23. Mediated media CC is sent from the DF3 6 to the LEMF 1.

The signalling described above allows the ATCF 16 and ATGW 19 to ensure LI continuity for a VoLTE communication subject to LI in the IMS domain and subsequently handed-over to GERAN/UTRAN in an SRVCC procedure.

Using the ATCF 16 and ATGW 19 functions as the IAP, it is be possible to perform media interception at the ATGW 19 and signalling interception at the ATCF 16, meaning that there is no need to perform LI at the MSC/MSS for the call after SRVCC.

In the embodiment described above, the LEMF only issues a warrant for LI; based on the warrant, the ADMF 2 activates LI in the ATCF 16. The ATCF 16 can then dynamically trigger LI at the ATGW 19 on a per session basis when LI is required.

Figure 7:
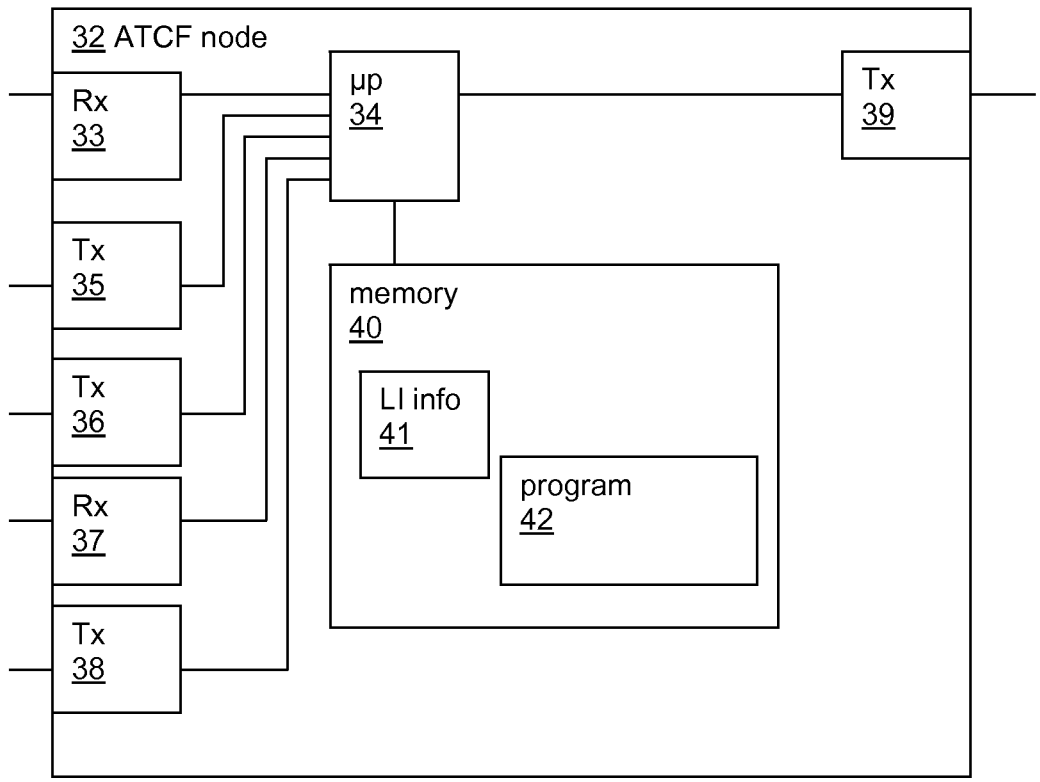
FIG. 7 illustrates schematically in a block diagram a network node having an ATCF according to an embodiment of the invention.

FIG. 7 illustrates schematically a node that provides an ATCF 16 function. The node 32 is provided with a first receiver 33 for receiving the activation message from the ADMF 2 that instructs lawful interception for communications in which a target subject participates. A processor 34 intercepts signalling relating to a communication session in which the subject participates. A first transmitter 35 is provided for sending intercept related information to the MF at the DF2. In this way, the ATCF 16 is used as an IAP for LI.

A second transmitter 36 is provided for sending signalling relating to the communication session to the UE 9 via the P-CSCF 17. A second receiver 37 is provided for receiving an instruction to perform Single Radio Voice Call Continuity on the communication session. Once SRVCC has been performed signalling relating to the communication session is sent to the UE 9 using a third transmitter 38 via the MSS/MSC at the circuit switched access network.

The node 32 may also be provided with a fourth transmitter 39 for sending an LI further activation message to the ATGW 19 instructing the ATGW to send media relating to the communication session to the MF 7 at DF3 6.

A computer readable medium in the form of a memory 40 may also be provided. The memory 40 can be used to store information 41 relating to LI, such as the identities of subjects for LI. Furthermore, memory 40 may be used to store a computer program 42 which, when executed by the processor, causes the node to behave as described above.

Note that the above description of the node 32 describes functional elements. The various receivers and transmitters described may be physically embodied as one or more transceivers, or a single transmitter or receiver may be used to perform several of the transmitter or receiver functions described. Similarly, only one processor and one memory are described, although it will be appreciated that they may be embodied in one or more physical processors or memories.

Figure 8:
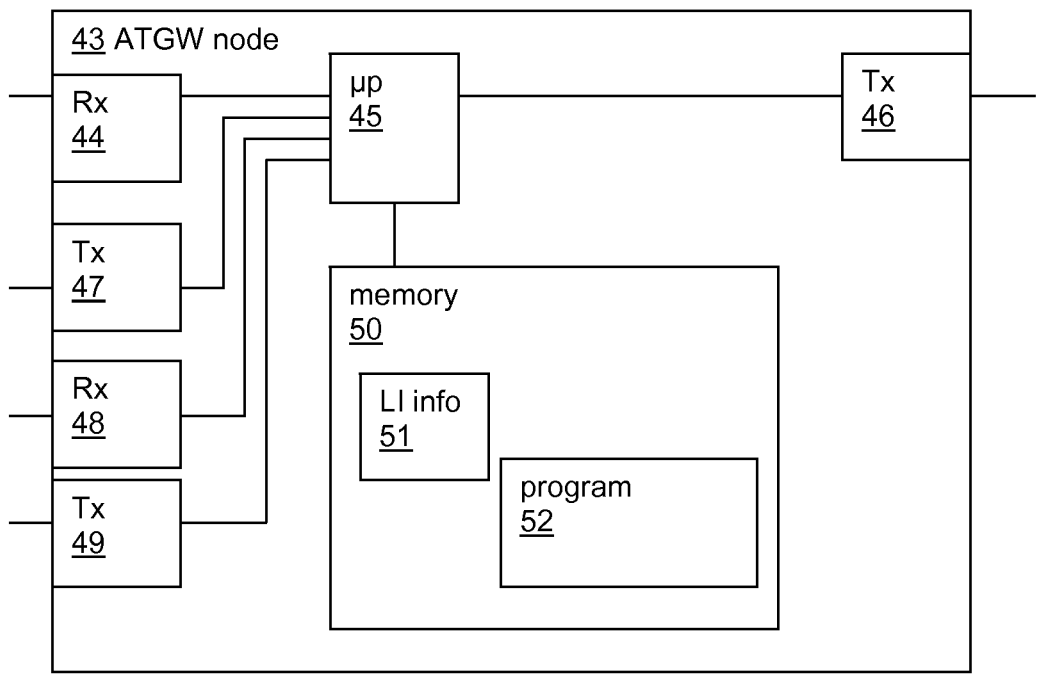
FIG. 8 illustrates schematically in a block diagram a network node having an ATGW function according to an embodiment of the invention.

FIG. 8 shows a node 43 for providing an ATGW 19 function according to an embodiment. The node 43 is provided with a first receiver 44 for receiving the LI an activation message instructing LI from the ATCF 16. A processor 45 is provided for intercepting media relating to the communication session. A first transmitter 46 sends the intercepted media to a MF 6. A second transmitter 47 is provided for sending media relating to the communication session to the UE using an Mb interface. A second receiver 48 is provided for receiving an instruction informing the ATGW 19 that SRVCC has been performed. A third transmitter 49 is provided for sending media relating to the communication session to the UE 9 via an MSS/MSC 20 in a circuit switched access network.

A computer readable medium in the form of a memory 50 may also be provided. The memory 50 can be used to store information 51 relating to LI, such as the identities of communication sessions subject to LI. Furthermore, the memory 50 may be used to store a computer program 52 which, when executed by the processor 45, causes the node to behave as described above.

Note that the above description of the ATGW node 43 describes functional elements. The various receivers and transmitters described may be physically embodied as one or more transceivers, or a single transmitter or receiver may be used to perform several of the transmitter or receiver functions described. Similarly, only one processor and one memory are described, although it will be appreciated that they may be embodied in one or more physical processors or memories.

Figure 9:
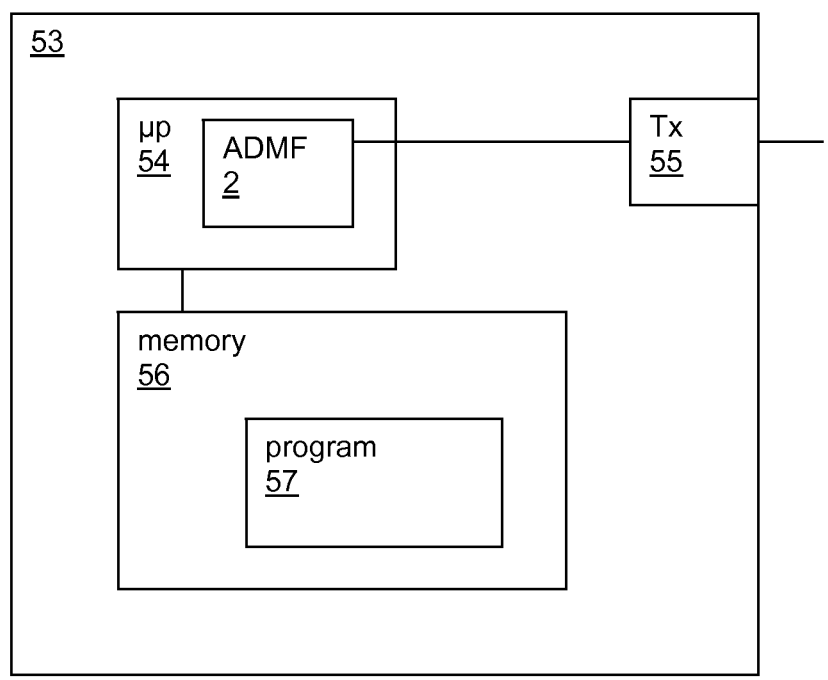
FIG. 9 illustrates schematically in a block diagram a network node having an ADMF according to an embodiment of the invention.

FIG. 9 illustrates a node 53 that has an ADMF 2 function. The node 53 is provided with a processor 54 that executes an ADMF 2 function and generates a request for LI that includes an identity of a subject of LI. The request may include activation, deactivation and interrogation functions towards the ATCF 16. A transmitter 55 is provided for sending the request to an ATCF 16 in an IP Multimedia Subsystem communications network.

A computer readable medium in the form of a memory 56 may also be provided. The memory 56 can be used to store a computer program 57 which, when executed by the processor 54, causes the node 53 to behave as described above.

The procedures and apparatus described above allow SRVCC to be deployed in situations where it is a legal requirement to provide LI. This will make it easier to roll out LTE services in areas that have existing CS infrastructure, and allows LEAs to be provided with accurate LI data related to SRVCC traffic It will be appreciated by the person of skill in the art that various modifications may be made to the above described embodiment without departing from the scope of the present invention. For example, the functions of the network node are described as being embodied at a single node, but it will be appreciated that different functions may be provided at different network nodes.

The following acronyms have been used in the above description:

3GPP 3rd Generation Partnership Project
3pcc Third party call control
ADMF (Lawful Intercept) Administration Function
ATCF Access Transfer Control Function
ATGW Access Transfer Gateway
CC Content of Communication
CRM Customer Relationship Management
CS Circuit Switching
DF Delivery Function
DF2 Delivery Function for IRI reporting
DF3 Delivery Function for CC reporting
ETSI European Telecommunications Standards Institute
EU European Union
FTP File Transfer Protocol
GSMA GSM Association
HI1 ETSI Hand over Interface number 1.
HI2 ETSI Hand over Interface number 2.
HI3 ETSI Hand over Interface number 3.
HTTP Hypertext Transfer Protocol
IAP Intercept Access Point
ICE Intercepting Control Element
IMS IP Multimedia Subsystem
INE Intercept Network Element
IP Internet Protocol
IRI Intercept Related Information
IW InterWorking function
LEA Lawful Enforcement Agency
LEMF Law Enforcement Monitoring Facility
LI Lawful Interception
LIID Lawful Interception Identifier
LTE Long Term Evolution
MF Mediation Function
MF2 Mediation Function of IRI
MF3 Mediation Function of CC
MME Mobility Management Entity
MSC Mobile Switching Centre
MSS Mobile Switching Centre Server
NWO Network Operator
TAS Telephony Application Server
VoLTE Voice over LTE

The invention claimed is:

1. A method of performing Lawful Interception in a communications network, the method comprising, at an Access Transfer Control Function (ATCF) node implemented by one or more processors:

Using the ATCF node as an Intercept Access Point (IAP) including:

receiving an activation message instructing lawful interception, the activation message including a subject identity identifying a subject sending intercept related information to a Mediation Function at a Lawful Intercept node, the intercept related information relating to a communication session in which the subject participates 2. The method according to claim 1, further comprising:

the ATCF node sending signalling relating to the communication session to a terminal associated with the subject via a Proxy-Call Session Control Function;

the ATCF node receiving an instruction to perform Single Radio Voice Call Continuity on the communication session; and the ATCF node sending signalling relating to the communication session to the terminal associated with the subject via a circuit switched access network.

3. The method according to claim 1, further comprising the ATCF node sending a further activation message to an Access Transfer Gateway, the further activation message instructing the Access Transfer Gateway to send media relating to the communication session in which the subject participates to a Mediation Function.

4. A computer program product comprising a non-transitory, computer-readable medium storing a computer program having computer readable code which, when run on a node in an IP Multimedia Subsystem communication network, causes the node to perform the method as claimed in claim 1.

5. A node for use in an IP Multimedia Subsystem communications network, the node comprising:

a first receiver configured to receive from an Administration Function an activation message instructing lawful interception, the activation message including a subject identity identifying a subject;

a processor configured to intercept signalling relating to a communication session in which the subject participates;

a first transmitter configured to transmit for sending intercept related information to a Mediation Function at a Lawful Intercept node, the intercept related information relating to the communication session;

a second transmitter configured to transmit signalling relating to the communication session to a terminal associated with the subject via a Proxy-Call Session Control Function;

a second receiver configured to receive an instruction to perform Single Radio Voice Call Continuity on the communication session;

and a third transmitter configured to transmit signalling relating to the communication session to the terminal via a circuit switched access network, wherein the node includes an Access Transfer Control Function(ATCF) configured as an Intercept Access Point (IAP).

6. The node according to claim 5, further comprising:

a fourth transmitter configured to transmit a further activation message to an Access Transfer Gateway node, the further activation message instructing the Access Transfer Gateway node to send media relating to the communication session to a Mediation Function.

7. The node according to claim 5, wherein the intercept related information is sent to the Mediation Function at the Lawful Intercept node via an X2 interface.

8. A node for use in an IP Multimedia Subsystem communications network, the node comprising:

a first receiver configured to receive, from an Access Transfer Control Function configured as an Intercept Access Point (IAP), an activation message instructing lawful interception of a communication session handled by the node;

a processor configured to intercept media relating to the communication session;

a first transmitter configured to transmit the intercepted media to a Mediation Function at a Lawful Intercept node;

a second transmitter configured to transmit media relating to the communication session to a terminal using an Mb interface;

a second receiver configured to receive an instruction to perform Single Radio Voice Call Continuity on the communication session; and a third transmitter configured to transmit media relating to the communication session to the terminal via a circuit switched access network.

9. A computer program product comprising a non-transitory, computer-readable medium storing a computer program having computer readable code which, when run on a node in an IP Multimedia Subsystem communications network, causes the node to behave as a node as claimed in claim 8.

10. A node for use in instructing Lawful Interception in a communications network, the node comprising:

an Administration Function implemented by one or more processors and configured to generate a request for Lawful Interception, the request including an identity of a subject of Lawful Interception; and a transmitter configure to transmit the request to an Access Transfer Control Function in an IP Multimedia Subsystem communications network which is configured as an Intercept Access Point (IAP).

* * * * *